US012730851B2

(12) United States Patent
Mehrdad et al.

(10) Patent No.: US 12,730,851 B2
(45) Date of Patent: Sep. 8, 2026

(54) SYSTEMS AND METHODS FOR RETRIEVING AND RANKING SEARCH RESULTS USING SESSION CONTEXT EMBEDDINGS

(71) Applicant: Walmart Apollo, LLC, Bentonville, AR (US)

(72) Inventors: Navid Mehrdad, San Jose, CA (US); Vishal Kumar Rathi, Wood Ridge, NJ (US); Utkarsh Porwal, Oakland Gardens, NY (US); Krishna Sravanthi Rajanala Sai, Dublin, CA (US); Ciya Liao, Fremont, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 19/041,456

(22) Filed: Jan. 30, 2025

(65) Prior Publication Data

US 2025/0245281 A1 Jul. 31, 2025

Related U.S. Application Data

(60) Provisional application No. 63/626,830, filed on Jan. 30, 2024.

(51) Int. Cl.
*G06F 16/9538* (2019.01)
*G06F 16/9532* (2019.01)
*H04L 67/50* (2022.01)

(52) U.S. Cl.
CPC ...... *G06F 16/9538* (2019.01); *G06F 16/9532* (2019.01); *H04L 67/535* (2022.05)

(58) Field of Classification Search
CPC . G06F 16/9538; G06F 16/9532; H04L 67/535
See application file for complete search history.

(56) References Cited

U.S. PATENT DOCUMENTS 8,751,470 B1 * 6/2014 Garg .................. G06F 16/9535 707/705
9,984,151 B2 * 5/2018 Liu .................... G06F 16/3325
10,579,688 B2 * 3/2020 Green ................ G06F 16/9535
(Continued)

OTHER PUBLICATIONS

Zhihui Zhang et al., "Context-aware Session-based Recommendation with Graph Neural Networks", IEEE, pp. 35-44 (Year: 2023).*
(Continued)

*Primary Examiner* — Jared M Bibbee
(74) *Attorney, Agent, or Firm* — FOLEY & LARDNER LLP

(57) ABSTRACT

A method can include: storing, on an electronic platform, a vectorized item database corresponding to a plurality of items; tracking electronic interactions between the electronic platform and a user computer during a user session; generating, using an embedding model, a session context embedding based, at least in part, on the electronic interactions tracked during the user session; in response to receiving the search query from the user computer, querying the vectorized item database to identify search results corresponding to one or more of the plurality of items, at least in part, using the session context embedding; and transmitting, by the electronic platform, the search results to the user computer. Other embodiments are disclosed.

20 Claims, 8 Drawing Sheets

(56) References Cited

U.S. PATENT DOCUMENTS

| | | | | |
|---|---|---|---|---|
| 11,004,135 | B1 | 5/2021 | Sandler | |
| 2016/0188659 | A1* | 6/2016 | Liu | G06F 16/3325 707/723 |
| 2016/0188660 | A1* | 6/2016 | Liu | G06F 16/9535 707/723 |
| 2018/0039647 | A1* | 2/2018 | Winstanley | G06F 16/9535 |
| 2018/0096071 | A1* | 4/2018 | Green | G06F 16/9535 |
| 2022/0222728 | A1 | 7/2022 | Gupta et al. | |
| 2023/0186366 | A1 | 6/2023 | Vaidyanathan et al. | |
| 2023/0214432 | A1* | 7/2023 | Tunkelang | G06N 3/08 707/722 |
| 2024/0281480 | A1* | 8/2024 | Bellam | G06F 16/9535 |
| 2025/0077237 | A1* | 3/2025 | Sachindran | G06N 3/08 |
| 2025/0335962 | A1* | 10/2025 | Seyfaie | G06N 3/0895 |
| 2025/0356409 | A1* | 11/2025 | Su | G06Q 30/0631 |

OTHER PUBLICATIONS

Tianwen Chen et al., "Improving Representation Learning for Session-based Recommendation", IEEE, pp. 854-863 (Year: 2022).*

Keping Bi et al., "Leverage Implicit Feedback for Context-aware Product Search", SIGIR eCom, pp. 1-10 (Year: 2019).*

Cagri Emre Yildiz et al., "Next Item Prediction Using Neural Networks with Embedding Initialized Weights", IEEE, pp. 338-342 (Year: 2021).*

Navid Mehrdad et al., "Session Context Embedding for Intent Understanding in Product", SIGIR, pp. 1-4 (Year: 2024).*

* cited by examiner

Network Adapter
220
Memory ROM/RAM
208
Hard Drive
114
CD-Rom Drive
116
Universal Serial Bus
112
Disk Controller
204
Graphics Adapter
224
214
System Bus
Video Controller
202
Monitor
106
CPU
210
Keyboard Adapter
226
Keyboard
104
Mouse Adapter
206
Mouse
110
Other I/O Devices
222

SYSTEMS AND METHODS FOR RETRIEVING AND RANKING SEARCH RESULTS USING SESSION CONTEXT EMBEDDINGS

CROSS-REFERENCE TO RELATED APPLICATIONS

This application claims priority to U.S. Provisional Application No. 63/626,830 filed on Jan. 30, 2024, which is incorporated by reference herein in its entirety for all purposes.

FIELD OF THE DISCLOSURE

The present disclosure generally relates to search results.

BACKGROUND

Search query technologies have been in existence for a few decades, and single query-item pair relevance is a technology often used for search queries. However single query-item pair relevance training for a search query often does not capture the customer intent of the search query. Accordingly, a need exists for systems and methods for search queries that can better deduce user intent to produce more relevant search results.

BRIEF DESCRIPTION OF THE DRAWINGS

To facilitate further description of the embodiments, the following drawings are provided in which.

Figure 1:
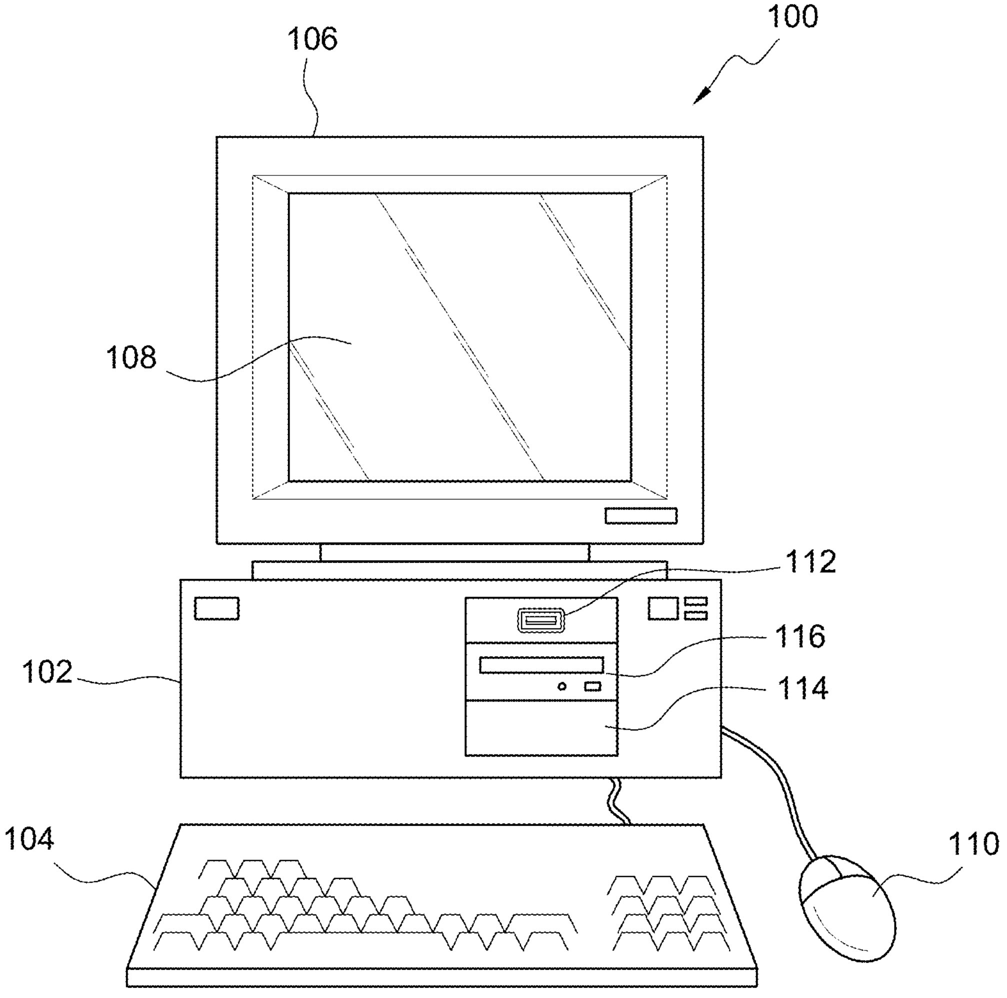
FIG. 1 illustrates a front elevation view of one or more computer systems that are suitable for implementing at least a portion of an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DETAILED DESCRIPTION

In some embodiments, a system include a processor and a non-transitory computer-readable storage device storing computing instructions. When executed on the processor, the computing instructions cause the processor to perform functions including: storing, on an electronic platform, a vectorized item database corresponding to a plurality of items; tracking electronic interactions between the electronic platform and a user computer during a user session; generating, using an embedding model, a session context embedding based, at least in part, on the electronic interactions tracked during the user session; in response to receiving a search query from the user computer, querying the vectorized item database to identify search results corresponding to one or more of the plurality of items, at least in part, using the session context embedding; and transmitting, by the electronic platform, the search results to the user computer.

In other embodiments, a method can be implemented via execution of computing instructions configured to run at a processor. The method can include: storing, on an electronic platform, a vectorized item database corresponding to a plurality of items; tracking electronic interactions between the electronic platform and a user computer during a user session; generating a query embedding based, at least in part, on a search query received from the user computer; generating, using an embedding model, a session context embedding based, at least in part, on the electronic interactions tracked during the user session; in response to receiving the search query from the user computer, querying the vectorized item database to identify search results corresponding to one or more of the plurality of items, at least in part, using the session context embedding and the query embedding; and transmitting, by the electronic platform, the search results to the user computer.

In further embodiments, a non-transitory computer readable storage medium can store computing instructions. When run on a processor, the computing instructions can cause the processor to perform functions including: storing, on an electronic platform, a vectorized item database corresponding to a plurality of items; tracking electronic interactions between the electronic platform and a user computer during a user session; generating a query embedding based, at least in part, on a search query received from the user computer; generating, using an embedding model, a session context embedding based, at least in part, on the query embedding, as generated, and the electronic interactions tracked during the user session; in response to receiving the search query from the user computer, querying the vectorized item database to identify search results corresponding to one or more of the plurality of items, at least in part, using the session context embedding and the query embedding; and transmitting, by the electronic platform, the search results to the user computer.

Figure 2:
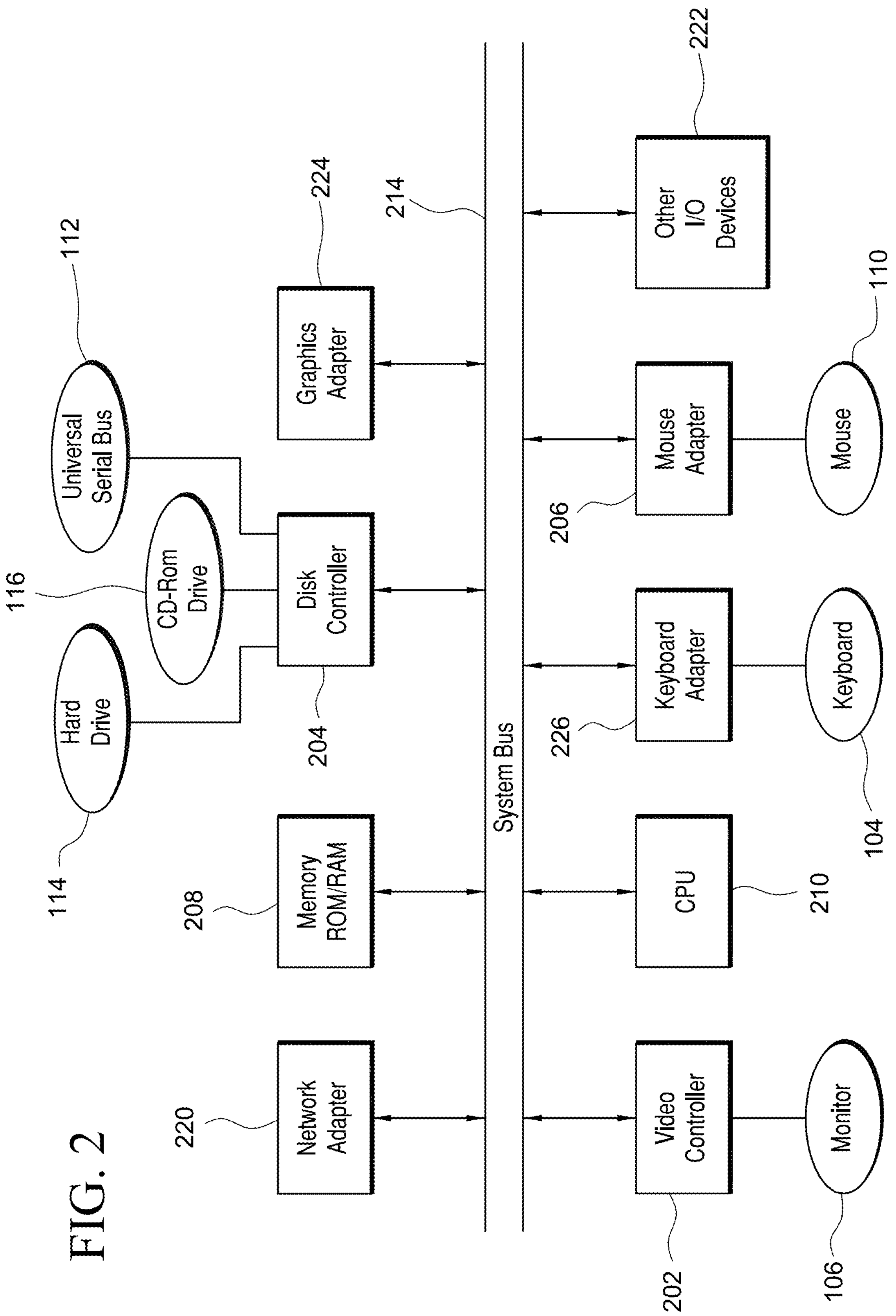
FIG. 2 illustrates a representative block diagram of an example of elements included in circuit boards inside the chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
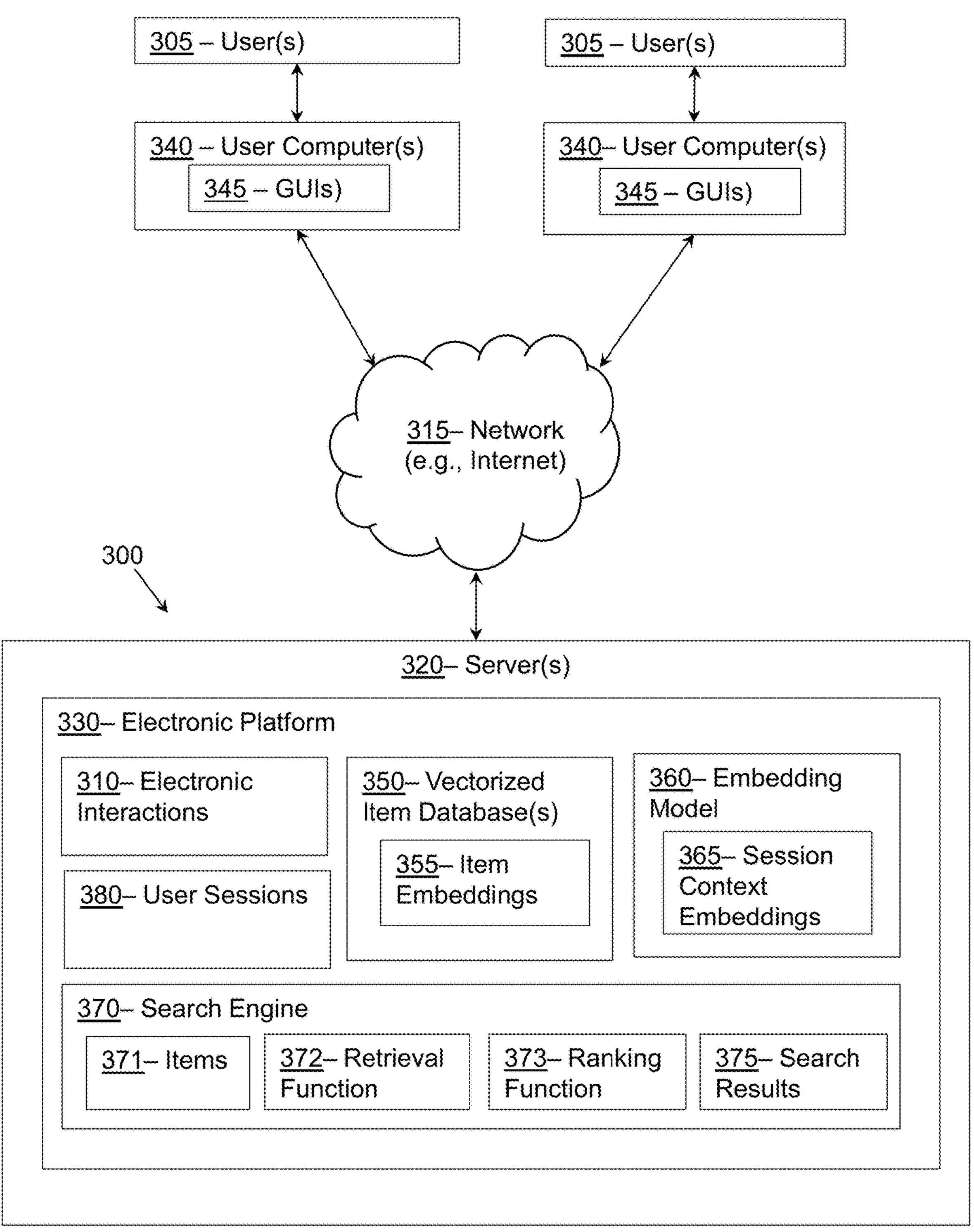
FIG. 3 illustrates a block diagram for a system for providing search results, according to one embodiment.

Turning ahead in the drawings, FIG. 3 illustrates a block diagram of a system 300 that can be configured to improve search result retrieval and ranking operations on electronic platform 330 using session context embeddings 365, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include one or more servers 320, one or more electronic platforms 330, one or more vectorized item databases 350, one or more embedding models 360, and/or one or more search engines 370. Each server 320, electronic platform 330, vectorized item database 350, embedding model 360, and/or search engine 370 can be (or include) a computer system, such as computer system 100 (FIG. 1), as described above, and can each be a single computer, a single server, or a cluster or collection of computers or servers, or a cloud of computers or servers. In another embodiment, a single computer system can host each of two or more of server 320, electronic platform 330, vectorized item database 350, embedding model 360, and/or search engine 370. Additional details regarding server 320, electronic platform 330, vectorized item database 350, embedding model 360 and search engine 370 are described herein.

In many embodiments, system 300 also can comprise user computers 340. User computers 340 can comprise any of the elements described in relation to computer system 100. In some embodiments, user computers 340 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia@ or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

In many embodiments, system 300 can comprise graphical user interfaces ("GUIs") 345. In the same or different embodiments, GUIs 345 can be part of and/or displayed by computing devices associated with system 300 and/or user computers 340, which also can be part of system 300. In some embodiments, GUIs 345 can comprise text and/or graphics (images) based user interfaces. In the same or different embodiments, GUIs 345 can comprise a heads up display ("HUD"). When GUIs 345 comprise a HUD, GUIs 345 can be projected onto glass or plastic, displayed in midair as a hologram, or displayed on monitor 106 (FIG. 1). In various embodiments, GUIs 345 can be color or black and white. In many embodiments, GUIs 345 can comprise an application running on a computer system, such as computer system 100, user computers 340, and/or servers 320. In the same or different embodiments, GUI 345 can comprise a website accessed through network 315 (e.g., the Internet). In some embodiments, GUI 345 can comprise an eCommerce website. In the same or different embodiments, GUI 345 can be displayed as or on a virtual reality (VR) and/or augmented reality (AR) system or display.

In some embodiments, server(s) 320 can be in data communication through network 315 (e.g., the Internet) with user computers (e.g., 340). In certain embodiments, the network 315 may represent any type of communication network, e.g., such as one that comprises the Internet, a local area network (e.g., a Wi-Fi network), a personal area network (e.g., a Bluetooth network), a wide area network, an intranet, a cellular network, a television network, and/or other types of networks. In certain embodiments, user computers 340 can be desktop computers, laptop computers, smart phones, tablet devices, and/or other endpoint devices. Server 320 can host one or more websites. For example, web server 320 can host an eCommerce website that allows users to browse and/or search for products, to add products to an electronic shopping cart, and/or to purchase products, in addition to other suitable activities.

In many embodiments, server 320, electronic platform 330, user computer 340, vectorized item database 350, embedding model 360, and/or search engine 370 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of server 320, electronic platform 330, user computer 340, vectorized item database 350, and/or embedding model 360 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of server 320, electronic platform 330, user computer 340, vectorized item database 350, embedding model 360, and/or search engine 370. In a similar manner, the processing module(s) and the memory storage module(s) can be local and/or remote to each other.

In many embodiments, server 320, electronic platform 330, vectorized item database 350, embedding model 360, and/or search engine 370 can be configured to communicate with one or more user computers 340. In some embodiments, user computers 340 also can be referred to as customer computers. In some embodiments, server 320, electronic platform 330, vectorized item database 350, embedding model 360, and/or search engine 370 can communicate or interface (e.g., interact) with one or more customer computers (such as user computers 340) through a network 315 (e.g., the Internet). Network 315 can be an intranet that is not open to the public. Accordingly, in many embodiments, server 320, electronic platform 330, vectorized item database 350, embedding model 360, and/or search engine 370 (and/or the software used by such systems) can refer to a back end of system 300 operated by an operator and/or administrator of system 300, and user computers 340 (and/or the software used by such systems) can refer to a front end of system 300 used by one or more users 305, respectively. In some embodiments, users 305 can also be referred to as customers, in which case, user computers 340 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, server 320, electronic platform 330, user computer 340, embedding model 360, and/or search engine 370 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database.

Meanwhile, communication between server 320, electronic platform 330, user computer 340, embedding model 360, search engine 370 and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Figure 4:
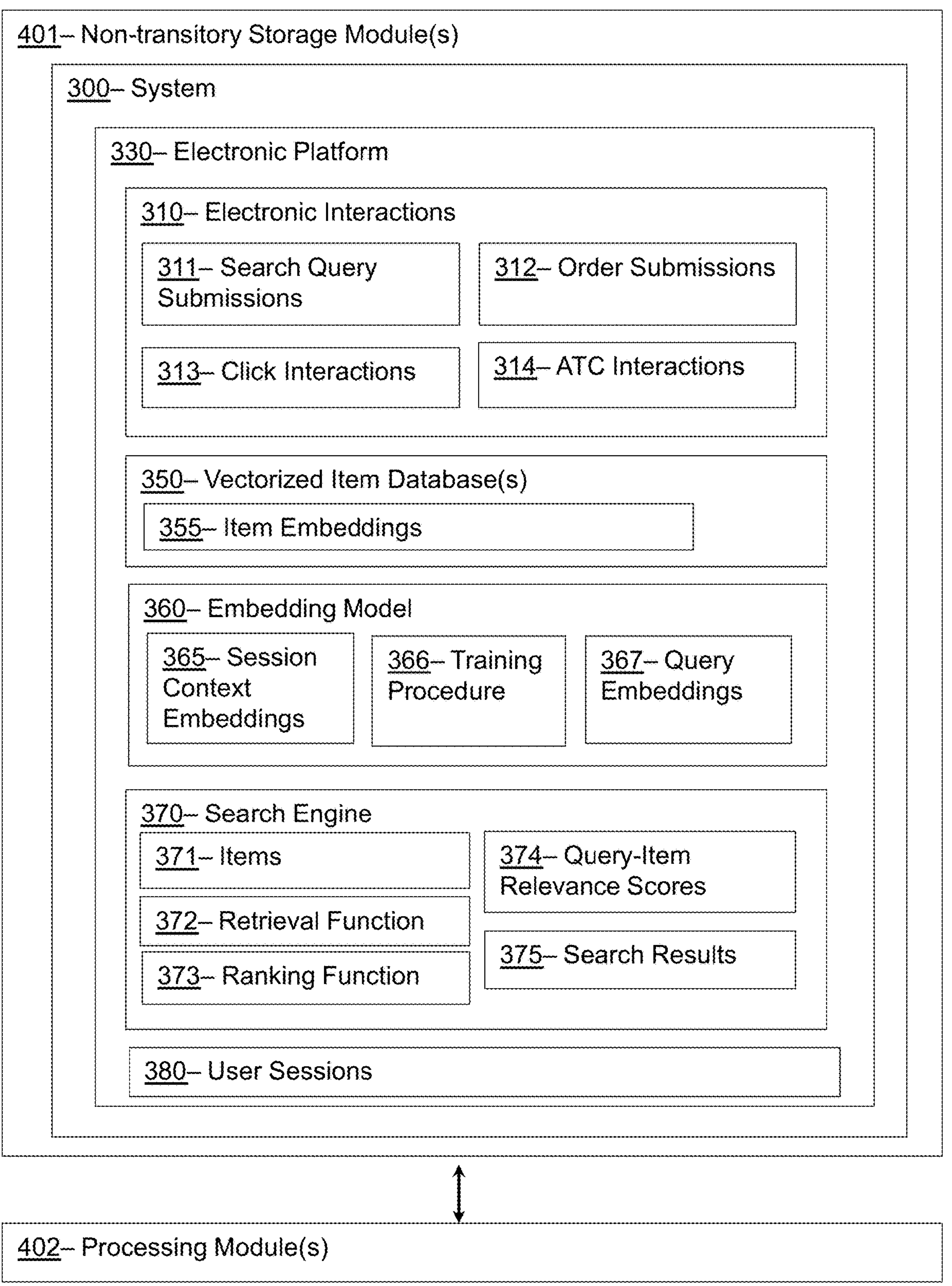
FIG. 4 illustrates a block diagram for a portion of the system of FIG. 3, according to an embodiment.

FIG. 4 is a block diagram illustrating a detailed view of a portion of system 300 in accordance with certain embodiments. The system 300, as shown in FIG. 4, includes one or more non-transitory storage modules 401 that are in communication with one or more processing modules 402. The one or more non-transitory storage modules 401 can include: (i) non-volatile memory, such as, for example, read-only memory (ROM) or programmable read-only memory (PROM); and/or (ii) volatile memory, such as, for example, random access memory (RAM), dynamic RAM (DRAM), static RAM (SRAM), etc. In these or other embodiments, storage modules 401 can comprise (i) non-transitory memory and/or (ii) transitory memory. The one or more processing modules 402 can include one or more central processing units (CPUs), graphical processing units (GPUs), controllers, microprocessors, digital signal processors, and/or computational circuits. The one or more storage modules 401 can store data and instructions corresponding to the functionalities of the electronic platform 330 described herein. The one or more processing modules 402 can be configured to execute any and all instructions associated with implementing the functions performed by the electronic platform 330 and/or components of the electronic platform 330.

With reference to FIGS. 3 and 4, the discussion below describes exemplary functionalities and configuration of system 300 and electronic platform 330.

In certain embodiments, users 305 may operate user computers 340 to browse, view, purchase, and/or order items 371 via the electronic platform 330. For example, the electronic platform 330 may include an eCommerce website that enables users 305 to add items 371 to a digital shopping cart 385 and to purchase the added items 371. The items 371 made available via the electronic platform 330 may generally relate to any type of product and/or service including, but not limited to, products and/or services associated with groceries, household products, entertainment, furniture, apparel, kitchenware, electronics, fashion, appliances, sporting goods, etc. A database associated with the electronic platform 330 can store and associate metadata with each item 371 (e.g., metadata including an item name, an item description, an item category, an item price, one or more images/videos corresponding to the item, and/or other data related to the item 371).

Electronic platform 330 can include a search engine 370 that assists users 305 with identifying items 371. The search engine 370 may generally represent any application, program, and/or feature that is configured to search for items 371 included in a database and/or an online catalog associated with the electronic platform 330. Users can be presented with GUIs 345 that enable the users to submit search queries to the search engine 370, and the GUIs 345 can present search results 375 corresponding to the search queries. Each of the search results 375 can correspond to an item 371 included in an online catalog associated with the electronic platform 330. Users 305 can utilize GUIs 345 to view the search results 375, select items 371 included in the search results 375 and, if desired, to add the items 371 to a digital shopping cart 385 and/or place orders for the items 371 (e.g., purchase and/or schedule the items 371 for delivery or pickup).

In many scenarios, the online catalog made available via the electronic platform 330 can comprise thousands or millions of items 371, and the search engine 370 can be configured to execute a retrieval function 372 on a large-scale database(s) to identify a relevance set of search results that are related or relevant to search queries submitted by users 305. Prior to presenting the search results 375 on a GUI 345 to a user 305, the search results 375 may be ordered or reordered by a ranking function 373 to generate a ranked set of search results 375. The ranked set of search results 375 may be presented on the GUI 345 for consideration by the user 305.

In some embodiments, the electronic platform 330 may generate and store a vectorized item database 350 to facilitate rapid searching of an item catalog. For each item 371 offered via the electronic platform 330, a corresponding item embedding 355 may be generated and stored in the vectorized item database 350. The item embeddings 355 can be generated using one or more embedding models 150 (examples of which are described in further detail below). In some examples, for each item 371, an embedding model 150 may receive a feature vector that includes metadata corresponding to a given item 371 (e.g., item name, item description, item category, item price, and/or other metadata), and may generate an item embedding 355 corresponding to the item 371 and store the item embedding 355 in the vectorized item database 350. Each item embedding 355 can include, or correspond to, a vector or numerical representation of a corresponding item 371 in a multi-dimensional vector space. When a user submits a search query for an item 371, the electronic platform 330 can execute a retrieval function 372 to identify relevant search results in the vectorized item database 350, as well as a ranking function 373 to order or rank the search results 375 before presentation to the user 305.

The electronic platform 330 may be configured to execute various types of retrieval functions 372 and/or ranking functions 373, which are aimed at accurately understanding the intent of a user's search query and/or presenting search results that are most relevant to that search query. However, accurately understanding the intent of a user's search query and/or presenting corresponding search results that are satisfy the intent of the search query can be technically challenging, especially in scenarios where the electronic platform 330 comprises large-scale item catalogs (e.g., that include thousands or millions of items 371).

One technique for retrieving and ranking the search results 375 can be based on generating query-item relevance scores 374 for some or all the items included in the item catalog. For example, in response to receiving a search query, the retrieval function 372 can compute query-item relevance scores 374 for the items 371 included in the online catalog. Each query-item relevance score 374 can include a value indicating the relevance or similarity of a corresponding item 371 to the search query. In some scenarios, the query-item relevance score 374 generated for each item 371 can be based, at least in part, on a comparison of a query embedding 367 (or feature vector) generated from a search query submitted by a user 305 with an item embedding 355 stored in the vectorized item database 350. The items 371 having the greatest query-item relevance score 374 can be included in a relevance set of search results 375. Prior to presenting the search results on a GUI 345 to a user 305, the search results can be ranked or ordered based on the query-item relevance scores 374 corresponding to the search results 375.

In many scenarios, the above retrieval and ranking technique fails to identify the most relevant search results and/or fails to properly rank the search results 375 before presentation to the user. This can be attributed, at least in part, to the fact that using a single query-item pair relevance does not always capture the user's intent when submitting a search query and ignores other types of interactions between the user and electronic platform that can be useful for understanding the intent of the user's query.

To overcome the aforementioned problems (and/or other technical challenges), the electronic platform 330 can be configured to track a variety of electronic interactions 310 during a current or ongoing user session 380, and deduce the user's intent from a series of engagements during the user sessions 380. The tracked electronic interactions 310 can be utilized as inputs for generating session context embeddings 365, which, in turn, can be utilized to conduct searches on the vectorized item database 350 and/or rank search results 375 retrieved by such searches. As explained in further detail below, the session context embeddings 365 utilized for retrieval and/or ranking operations can more accurately capture the intent of a user's search query, and increase the precision of the electronic platform 330 with respect to presenting relevant search results 375 to the user 305.

When a user 305 accesses the electronic platform 330 (e.g., via a web browser, mobile app, desktop app, or otherwise), the electronic platform 330 can create a user session 380. In some embodiments, the user session 380 may correspond to a particular period of time when the user 305 interacts with the electronic platform 330, which begins when the user initially accesses the platform 330 and ends when the user leaves the electronic platform 330 or is inactive for a specified period of time.

For each current or ongoing user session 380, the electronic platform 330 may track and/or monitor various types of electronic interactions 310. Exemplary electronic interactions 310 tracked or monitored by the electronic platform 330 may include:

(a) Search query submissions 311: A search query submission 311 may include submission of a search query (e.g., a textual or string-based search query) to the electronic platform 330. In some examples, the search query submission 311 can be defined and submitted by a user 305 via a GUI 345 presented on a user computer 340. The user can input the search query submission 311 to the search engine 370 to search for desired items 371 on the electronic platform.

(b) Order submission 312: An order submission 312 may include user interactions that involve placing an order for one or more items 371, submitting a payment for the one or more items 371, and/or scheduling a pickup or delivery for the one or more items 371. In some examples, the order submission 312 may be submitted by a user 305 via a GUI 345 presented on a user computer 340. The user 305 can place the order submission 312 to receive or retrieve the one or more items 371.

(c) Click interactions 313: A click interaction 313 can include receiving an input or selection (e.g., mouse click, tap gesture, etc.) relating to an item 371 on the electronic platform 330 and/or receiving a request to view an item 371 offered via the electronic platform 330. In some examples, the user 305 may select an item 305 presented on a GUI 345 to view details related to the item, and the user may be presented with options for adding the item 371 to a digital shopping cart and/or placing an order for the item 371.

(d) Add-to-cart (ATC) interactions 314: An ATC interaction 314 can include receiving an input or selection to add an item 371 to a digital shopping cart. In some examples, when a user 305 is viewing details of an item and/or search results that include the item 371, an option may be presented that enables the user to add the item 371 to a digital shopping cart.

The electronic platform 330 may track or monitor other types of electronic interactions 310 in addition to those listed above. In some examples, the electronic interactions 310 tracked or monitored may additionally, or alternatively, include: a) filter interactions (e.g., the user's selection of various filters, such as those configured to filter items 371 based on price, category, expected delivery time, manufacturer, brand, etc.); b) item sharing interactions (e.g., the user's sharing of items with other users); c) advertisement interactions (e.g., the user's selection of advertisements provided by the electronic platform and/or external platforms); and/or d) viewing duration interactions (e.g., indicating the time spent viewing particular items).

In addition to explicit engagements or interactions, the electronic interactions 310 may further include other types of activities in which information or data that is provided to, or accessed by, the electronic platform 330. In some examples, the electronic interactions 310 may include interactions where the electronic platform 130 obtains or accesses location information (e.g., global positioning system or GPS coordinates) of the user computer 340 operated by the user, device information (e.g., indicating the type of device and/or operating system) of the user computer 340 operated by the user. In some additional examples, the electronic interactions 310 may include interactions in which the electronic platform 130 obtains or accesses user context information for a user, e.g., which identifies attributes of the user (e.g., age, gender, income, etc.), as well as affinities or preferences of the user (e.g., with respect to particular brands, price ranges, categories of products, delivery preferences, etc.). The user context information may be aggregated and/or continuously updated by the electronic platform 330 across multiple user sessions 380, and may reflect user patterns based on previous interactions with the electronic platform 330.

During a user session 380 with a given user 305, electronic platform 330 can monitor or track some or all of the exemplary electronic interactions 310 mentioned above across the user session to aid the electronic platform 330 in more accurately understanding the intent of user's search query submission 311. Additionally, the electronic platform 330 may generate a session context embedding 365 based on some or all or the electronic interactions 310 that were tracked or monitored during the current user session 380. Throughout the user session 380, the session context embedding 365 can be continuously updated as additional electronic interactions 310 are recorded by the electronic platform 330.

When a search query submission 311 is received by the electronic platform 330, the session context embedding 365 can be utilized (either independently or in combination with other inputs or embeddings) by the search engine 370 to search the vectorized item database 350, identify a relevant set of search results 375, and/or rank the identified search results 375. Using the session context embedding 365 to identify and/or rank the search results can significantly improve the alignment of the search results 375 with the intent of the user's search query submission 311.

In some examples, the session context embedding 365 is utilized by the retrieval function 372 of the search engine 370 to identify a relevant set of search results 375. In some cases, this may be accomplished by computing a similarity score for each of the item embeddings 355. The similarity score computed for each item embedding 355 may represent a metric that quantifies the closeness or distance between the session context embedding and the item embedding in a multi-dimensional vector space. In some examples, the similarity scores can be computed using a similarity function that measures cosine similarity, Euclidian distance, Hamming distance, and/or other similar distance metric.

In some embodiments, the item embeddings 355 (or corresponding items 371) having the highest similarity score (or closest distance) can be selected for inclusion in the relevant set of search results. Additionally, or alternatively, the similarity scores can be used as an input in combination with other variables to identify the relevant set of search results.

Additionally, or alternatively, the session context embedding 365 can be utilized by the ranking function 373 to order or reorder the search results 375 determined to be relevant. For example, the similarity scores derived from the comparison of the session context embedding 365 with the item embeddings 355 can be utilized to rank the search results 375 (e.g., such the item embeddings, or corresponding items, can be reordered from highest to lowest based on their scores and/or based on their distance measures).

Both the session context embeddings 365 and item embeddings 355 can be generated using an embedding model 360. The embedding model 360 may represent or include a large language model (LLM). In some embodiments, the LLMs may comprise transformer-based neural network architectures that are adapted to generate the session context embeddings 365 and item embeddings 355. For example, in some embodiments, the embedding model 360 can include or represent one or more of the following: a DeBERTa (Decoding-enhanced BERT with disentangled attention) model, a BERT (Bidirectional Encoder Representations from Transformers) model, a ROBERTa (Robustly optimized BERT approach) model, a GPT (Generative Pre-trained Transformer) model, Llama, Mistral, and/or other similar model.

In some examples, the embedding model 360 can be stored and executed directly on the electronic platform 330. Additionally, or alternatively, the embedding model 360 can be stored on a third-party platform and the electronic platform 330 can communicate with the embedding model 360 over a network 315 (e.g., by accessing an application programming interface or API available via the third-party platform).

In some examples, the same embedding model 360 can be utilized to generate both the session context embeddings 365 and item embeddings 355, which can be useful in improving the accuracy of the similarity comparisons performed between the session context embeddings 365 and item embeddings 355. In other embodiments, the session context embeddings 365 can be generated by an embedding model 360 that is different or separate from the embedding model 360 utilized to generate the item embeddings 355.

Figure 5:
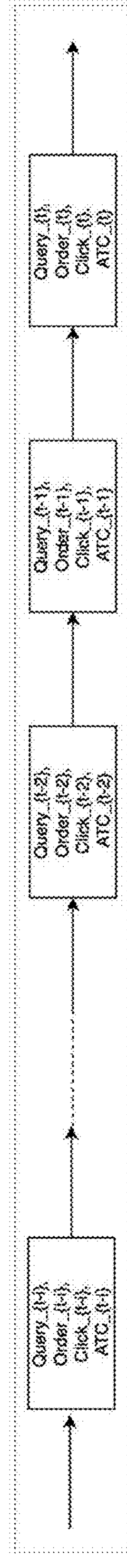
FIG. 5 illustrates a diagram of an aggregation of user engagements, according to an embodiment.

FIG. 5 is a diagram illustrating the aggregation of electronic user engagements during a user session. In this example, a feature vector, array and/or other data structure is utilized to track electronic interactions corresponding to search query submissions, order submissions, click interactions, and ATC interactions. At each time interval t, the data structure is updated to reflect the electronic interactions that have occurred during the session. This sequence of electronic interactions can be tracked during a runtime implementation of the electronic platform, and they can be recorded during the session to reliably infer the intent of the user at a given point in time.

Figure 6:
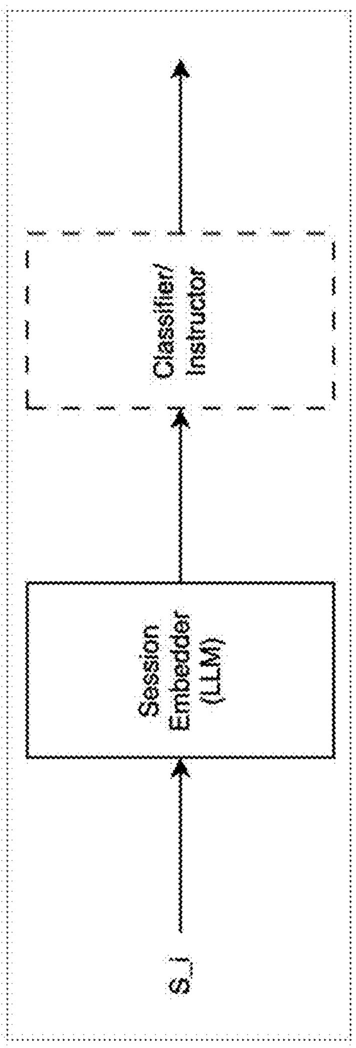
FIG. 6. Illustrates a diagram of an embedding model, according to an embodiment.

FIG. 6 is a diagram illustrating details of an exemplary embedding model according to certain embodiments. The embedding model (which is labeled "session embedder") can receive an input (S_i) comprising a feature vector, array and/or other data structure that includes the aggregated electronic interactions during a given user session. The embedding model can execute a vectorization or encoding function on the received input to generate and output a session context embedding. In some embodiments, these session context embeddings generated by the embedding model may serve as vehicles for translating textual input from past queries, and their engaged item attributes (e.g., such as item title, gender, size, brand, description, etc.) into an embedding vector, which in turn can be used for user intent understanding. This vector can be used for product type classification, item attribute detection, and generative purposes alike. Additionally, it can be saved as a part of runtime infrastructure of the electronic platform, and can be accessed efficiently during the intent understanding process when search queries are submitted by the user.

Returning to FIGS. 3 and 4, a training procedure 366 can be executed to train the embedding model 360 to generate the session context embeddings 365. The type of training procedure 366 utilized to train the embedding model 360 can vary, and generally can include any appropriate supervised, semi-supervised, or unsupervised training procedure.

In some embodiments, the training procedure 366 can include a supervised training procedure in which the embedding model 360 is trained on a set of training features extracted from prior user interactions captured by the electronic platform 330. In some cases, the training features may be segregated into different a plurality of different feature sets on a per session basis, such that each set of training features corresponds to a separate user session 380 and includes the some or all of the following electronic interactions captured during that user session including: a) search query submissions 311 recorded during the user session 380; b) items 371 that were included in order submissions 312 during the user session 380; c) items 371 that were included in ATC interactions 314 during the user session 380; d) items 371 that were selected by click interactions 313 during the user session 380; e) search filters that were selected or applied during the user session 380; f) the geolocation of the user during the user session 380; g) the device type operated by the user during the user session 380; and/or g) customer context information (e.g., identifying user attributes and/or affinities) related to the user affiliated with the user session 380.

The training procedure 366 can further include labeling each set of training features with a training label that identifies the outcome of the user session 380. For example, the training label may indicate whether the user session 380 resulted in a conversion, abandonment, non-abandonment, ATC interaction, order placement, etc. The labeled sets of features may then be fed into the embedding model 360 to train the embedding model 360 to accurately generate the session context embeddings 365.

As described above, utilization of the session context embeddings 365 can significantly improve the ability of the search engine 370 in understanding the user's intent compared to traditional techniques, such as those that rely solely on query-item relevance. However, in some embodiments, consideration of both the query-item relevance and session context embeddings 365 can further improve the ability of the search engine 370 to identify the intent of user's query.

Figures 7A, 7B:
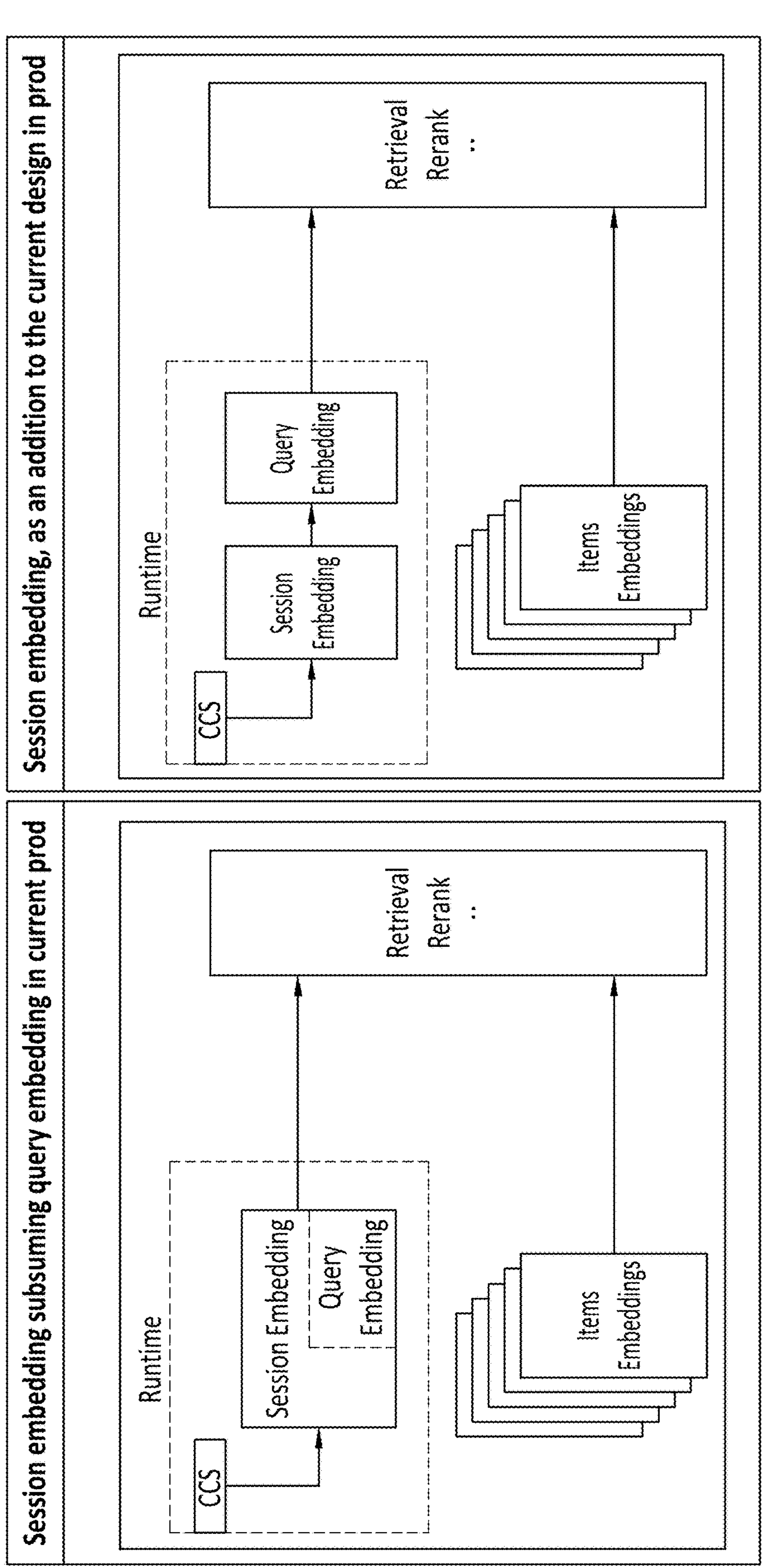
FIG. 7A illustrates a first system configuration, according to an embodiment.
FIG. 7B illustrates a second system configuration, according to an embodiment.

FIGS. 7A-B are block diagrams illustrating two different system configurations for jointly considering query-item relevance and session context embeddings to deduce the intent of a user.

As explained above, techniques for evaluating query-item relevance can involve the generation of a query embedding 367 (FIG. 4) based on the vectorization of a textual search query submitted by a user. This query embedding can be generated using an appropriate embedding model (which can be the same embedding model used to generate the session context embeddings or a separate embedding model specifically configured to generate the query embeddings).

FIG. 7A illustrates a first system confirmation for combining a session context embedding with a query embedding. In this scenario, the query embedding is included the array or data structure that captures the electronic interactions for a given session, and can be viewed as an additional dimension that is utilized deriving the session context embedding. Thus, in this embodiment, the session context embedding subsumes the query embedding, which allows the information from query embedding to be considered in generating the session context embedding. The session context embedding can then be utilized as input to the retrieval function and/or ranking function of the search engine, which also receives and/or accesses the item embeddings to facilitate searches on items using the session context embedding.

FIG. 7B illustrates a second system configuration for combining a session context embedding with a query embedding. In this scenario, the query embedding is independent of the session context embedding, and the separate embeddings are merged using a combination function. Exemplary combination functions that can be used for combining the query embedding and session context embedding may include a concatenation function, element-wise combination function, a weight sum function, an averaging function, etc. Other types of combination functions also may be utilized. The combined session/query embedding can be utilized as an input to the retrieval function and/or ranking function of the search engine, which also receives and/or accesses the item embeddings to facilitate searches on items using the combined session/query embedding.

Figure 8:
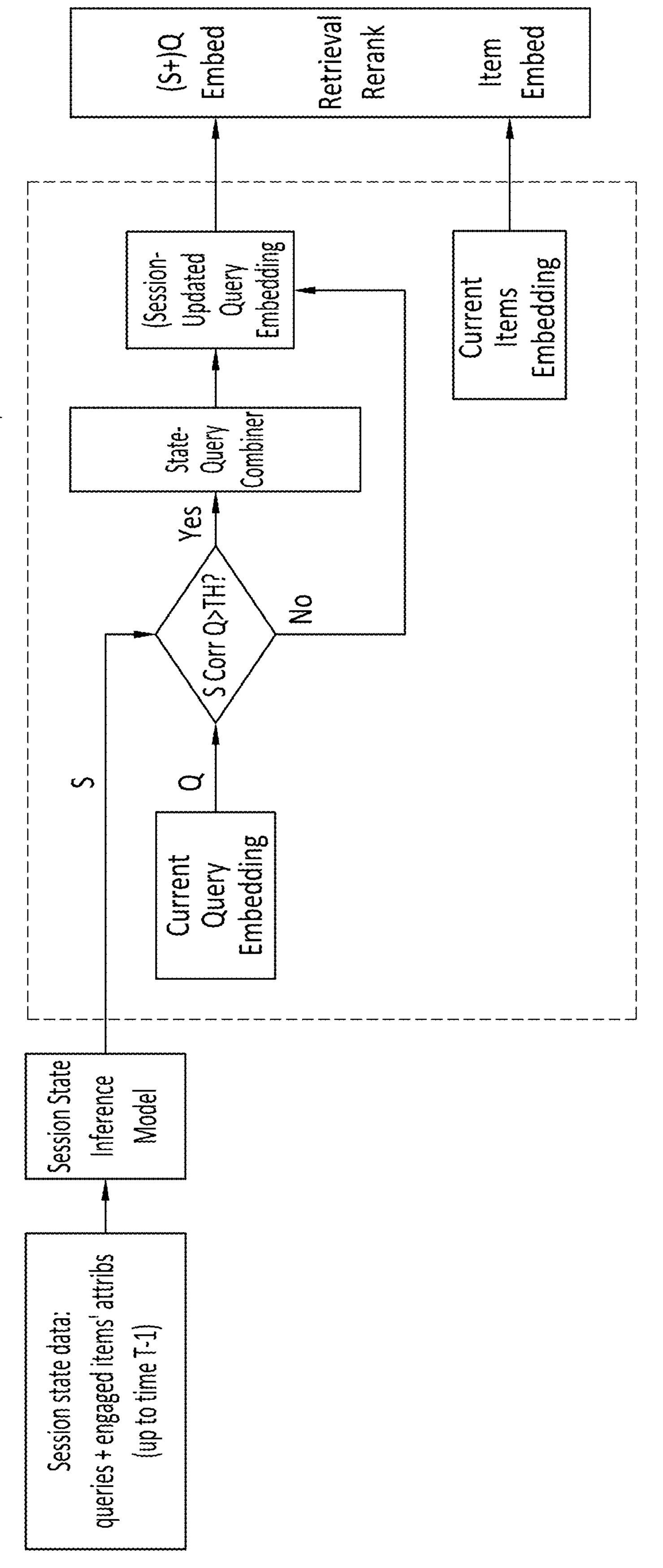
FIG. 8 illustrates a block diagram of a process flow, according to an embodiment.

FIG. 8 is block diagram illustrating a process flow for determining a session state inference for a runtime implementation of the search engine and/or electronic platform.

The state of a user session (S_T) is a function of previous electronic interaction attributes (e.g., including previous queries and past engaged items) up to time T−1. The state is inferred prior to runtime inferences at time T. At runtime, the current query embedding Q, is combined with the session context embedding or vector S so that an augmented query embedding (Q+S) can be used for session-aware retrieval and ranking of search results.

In some embodiments, the user session up to time T−1 is combined with current query only if a minimum correlation between S_{T−1} and Q_T exists. While the generalized flow of the session context embedding can use a session state vector and current query vector for correlation measurement, simpler correlation mechanisms, such as a pre-vectorization token match between previous query Q_{T−1} and Q_T current query, also can be used. If the session state is taken as previous query, the state-query combination is a simple concatenation and the session context embedding corresponds to an LLM inference (or embedding model inference) on (Q_{T−1},Q_T). As demonstrated in further detail below, testing has demonstrated that this simple scheme provides major improvement over alternative query product type classifiers.

Additional details are provided below describing an exemplary methodology that can be applied according to certain embodiments, along with evaluation results that were produced in an exemplary testing implementing.

The methodology can include a step of augmenting the query and item to the session level. To elucidate the point about (item1,item2) being surfaced for (query1,query2) pair on the session level based on engagement label training, one can represent (item1,item2) as an augmentation of item, and (query1,query2) as an augmentation of query. If it is known that (query1,query2) is going to occur, the (item1,item2) will surface provided all other variables stay the same between query 1 and query2 in the same manner that item_i is surfaced for query_i. The occurrence of (q_{i−k}, . . . , q_{i−2}, q_{i−1}, q_i, . . . , }, and their engaged/converted items, is sequential. Therefore, the methodology constructs a state vector S_i that can represent (q_{i−k}, . . . , q_{i−2}, q_{i−1}) up to time i.

To demonstrate the utility of the session context embedding, a testing implementation was constructed using a light weight LLM (deberta small v3) to train a query product type classifier with previous queries as session states. The training data was derived from session data captured during a three-month period on an electronic platform, whereby (q_{i−1}, q_i) pairs with q_i having at least one order, and q_{i−1} lacks orders. These query pairs are filtered to those pairs with token matches. Labels are the product type of ordered items. A training dataset of 44.7M datapoints was used. In addition to previous queries, datasets were constructed in which the session state includes ATC interactions and clicked item attributes for previous queries.

Weighted F1 scores are illustrated in Table 1 below, which demonstrates PT classification training using session context on Deberta V3 small, 44M params (compared to BERT base uncased 110M params used in QUMT).

TABLE 1

| | f1 on test (weighted, 6k+ class) | # datapoints, training | #epochs |
|---|---|---|---|
| current query, previous query, previous ATCed item attribs | 85.14% | 6,346,447 | 2 |
| current query, previous query, previous Clicked item attribs | 83.62% | 4,811,928 | 2 |
| current query, previous query: only broad to narrow transitions | 85.42% | 12,605,589 | 2 |
| current query, previous query: only narrow to broad transitions | 80.38% | 5,648,265 | 2 |
| current query, previous query | 83.72% | 44,671,909 | 2 |
| current query | 82.92% | 44,671,909 | 2 |
| QUMT, pt task, validation | 80.80% | 46.27M | 24 |

Attachment A, which is incorporated by reference herein in its entirety, provides additional details related to the systems, methods, and techniques described herein.

Figure 9:
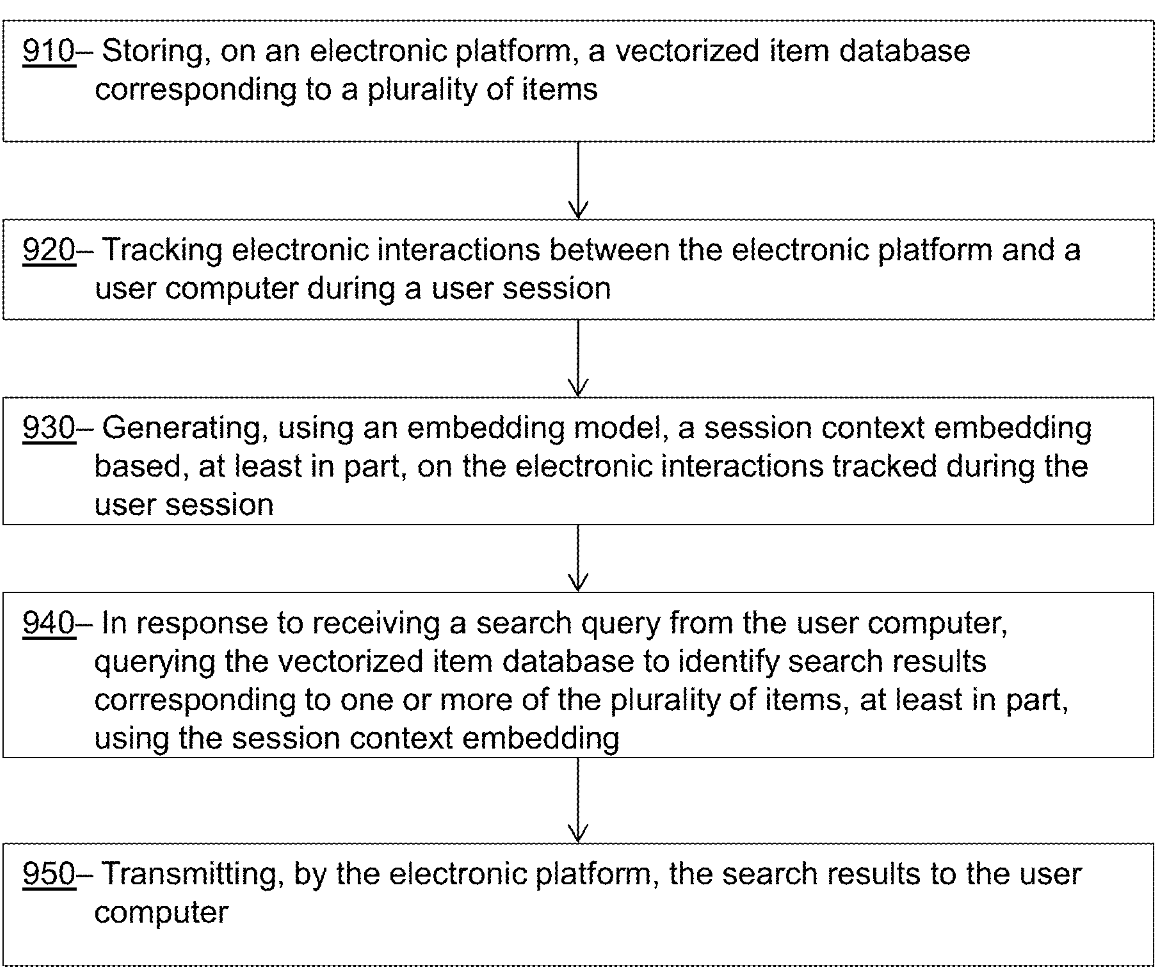
FIG. 9 illustrates a flow chart for a method, according to an embodiment.

FIG. 9 illustrates a flow chart for an exemplary method 900 according to certain embodiments. Method 900 is merely exemplary and is not limited to the embodiments presented herein. Method 900 can be employed in many different embodiments or examples not specifically depicted or described herein. In some embodiments, the steps of method 900 can be performed in the order presented. In other embodiments, the activities of method 900 can be performed in any suitable order. In still other embodiments, one or more of the steps of method 200 can be combined or skipped. In many embodiments, system 300 and/or electronic platform 330 can be configured to perform method 900 and/or one or more of the steps of method 900. In these or other embodiments, one or more of the steps of method 900 can be implemented as one or more computer instructions configured to run at one or more processing modules and configured to be stored at one or more non-transitory computer storage modules. Such non-transitory memory storage modules can be part of a computer system such as system 300 and/or electronic platform 330. The processing module(s) and non-transitory memory storage modules can be similar or identical to those described above.

Step 910 of method 900 includes storing, on an electronic platform, a vectorized item database corresponding to a plurality of items.

Step 920 of method 900 includes tracking electronic interactions between the electronic platform and a user computer during a user session.

Step 930 of method 900 includes generating, using an embedding model, a session context embedding based, at least in part, on the electronic interactions tracked during the user session.

Step 940 of method 900 includes, in response to receiving a search query from the user computer, querying the vectorized item database to identify search results corresponding to one or more of the plurality of items, at least in part, using the session context embedding.

Step 950 of method 900 includes transmitting, by the electronic platform, the search results to the user computer.

In many embodiments, the techniques described herein can provide a practical application and several technological improvements. In some embodiments, the techniques described herein can improve the accuracy of search results by deriving the intent of a search query based on electronic interactions track or monitored during a user session. These techniques described herein can provide a significant improvement over conventional approaches for retrieving and ranking search results, such as approaches that present search results in an ordering that is based purely on query-item relevance.

In a number of embodiments, the techniques described herein can advantageously improve user experiences by providing search results that more accurately align the intent of the user, which enables the user to identify desired search results more rapidly.

In many embodiments, the techniques described herein can be used continuously at a scale that cannot reasonably be performed using manual techniques or the human mind. For example, as described above, electronic platforms may store thousands or millions of items, and the techniques described herein can rapidly identify relevant search results corresponding to the items, and compare embeddings corresponding to the items with embeddings derived from user session activities.

In a number of embodiments, the techniques described herein can solve a technical problem that arises only within the realm of computers, as machine learning models (such as the embedding models described herein) do not exist outside the realm of computer networks.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:

a processor; and a non-transitory computer-readable storage device storing computing instructions that, when executed on the processor, cause the processor to perform functions comprising:

storing, on an electronic platform, a vectorized item database corresponding to a plurality of items;

tracking electronic interactions between the electronic platform and a user computer during a user session;

generating, using an embedding model, a session context embedding based, at least in part, on a query embedding that is based on the electronic interactions tracked during the user session;

in response to receiving a search query from the user computer, querying the vectorized item database to identify search results corresponding to one or more of the plurality of items, at least in part, by comparing the session context embedding with an item embedding in the vectorized item database; and transmitting, by the electronic platform, the search results to the user computer.

2. The system of claim 1, wherein execution of the computing instructions further causes the processor to perform a function comprising:

determining a ranking for the search results based, at least in part, on the session context embedding, wherein the search results transmitted to the user computer are ordered based on the ranking.

3. The system of claim 1, wherein tracking the electronic interactions between the electronic platform and the user computer comprises:

monitoring search query submissions received from the user computer during the user session;

monitoring order submissions received from the user computer during the user session;

monitoring click interactions received from the user computer during the user session; and monitoring add-to-cart (ATC) interactions received from the user computer during the user session.

4. The system of claim 3, wherein the embedding model generates the session context embedding based, at least in part, on the search query submissions, the order submissions, the click interactions, and the ATC interactions received during the user session.

5. The system of claim 1, wherein execution of the computing instructions further causes the processor to perform an additional function comprising:

generating the query embedding based, at least in part, on the search query, and wherein the electronic interactions include a submission of the search query.

6. The system of claim 5, wherein both the session context embedding and the query embedding are utilized to identify the search results.

7. The system of claim 1, wherein:

the query embedding is utilized as an input to generate the session context embedding; and the session context embedding is utilized by a retrieval function to identify the search results.

8. The system of claim 1, wherein a combination function is utilized to combine or concatenate the query embedding and the session context embedding.

9. The system of claim 1, wherein the embedding model is trained on feature sets derived from previous electronic interactions collected during previous user sessions on the electronic platform.

10. The system of claim 9, wherein each of the previous user sessions are annotated with labels identifying outcomes associated with the previous user sessions.

11. A method implemented via execution of computing instructions configured to run at a processor, the method comprising:

storing, on an electronic platform, a vectorized item database corresponding to a plurality of items;

tracking electronic interactions between the electronic platform and a user computer during a user session;

generating a query embedding based, at least in part, on a search query received from the user computer;

generating, using an embedding model, a session context embedding based, at least in part, on the electronic interactions tracked during the user session;

in response to receiving the search query from the user computer, querying the vectorized item database to identify search results corresponding to one or more of the plurality of items, at least in part, by comparing the query embedding with an item embedding in the vectorized item database or comparing the session context embedding with the item embedding; and transmitting, by the electronic platform, the search results to the user computer.

12. The method of claim 11, wherein the method further comprises:

determining a ranking for the search results based, at least in part, on the session context embedding, wherein the search results transmitted to the user computer are ordered based on the ranking.

13. The method of claim 11, wherein tracking the electronic interactions between the electronic platform and the user computer comprises:

monitoring search query submissions received from the user computer during the user session;

monitoring order submissions received from the user computer during the user session;

monitoring click interactions received from the user computer during the user session; and monitoring add-to-cart (ATC) interactions received from the user computer during the user session.

14. The method of claim 13, wherein the embedding model generates the session context embedding based, at least in part, on the search query submissions, the order submissions, the click interactions, and the ATC interactions received during the user session.

15. The method of claim 11, wherein:

the query embedding is utilized as an input to generate the session context embedding; and the session context embedding is utilized by a retrieval function to identify the search results.

16. The method of claim 11, wherein a combination function is utilized to combine or concatenate the query embedding and the session context embedding.

17. The method of claim 11, wherein the embedding model is trained on feature sets derived from previous electronic interactions collected during previous user sessions on the electronic platform.

18. The method of claim 17, wherein each of the previous user sessions are annotated with labels identifying outcomes associated with the previous user sessions.

19. A non-transitory computer readable storage medium storing computing instructions, the computing instructions, when run on a processor, causing the processor to perform functions comprising:

storing, on an electronic platform, a vectorized item database corresponding to a plurality of items;

tracking electronic interactions between the electronic platform and a user computer during a user session;

generating a query embedding based, at least in part, on a search query received from the user computer;

generating, using an embedding model, a session context embedding based, at least in part, on the query embedding, as generated, and the electronic interactions tracked during the user session;

in response to receiving the search query from the user computer, querying the vectorized item database to identify search results corresponding to one or more of the plurality of items, at least in part, by comparing the query embedding with an item embedding in the vectorized item database or comparing the session context embedding with the item embedding; and transmitting, by the electronic platform, the search results to the user computer.

20. The non-transitory computer readable storage medium of claim 19, wherein:

the session context embedding is utilized by a retrieval function to identify the search results.

* * * * *